(12) United States Patent
Neumann et al.

(10) Patent No.: US 12,101,255 B2
(45) Date of Patent: Sep. 24, 2024

(54) COMMUNICATION SYSTEM, COUPLING COMMUNICATION DEVICE AND METHOD FOR TRANSMITTING TIME-CRITICAL DATA

(71) Applicant: Siemens Aktiengesellschaft, Munich (DE)

(72) Inventors: Markus Neumann, Karlsruhe (DE); Wolfgang Schwering, Röttenbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/291,665

(22) PCT Filed: Jun. 22, 2022

(86) PCT No.: PCT/EP2022/067023
§ 371 (c)(1),
(2) Date: Jan. 24, 2024

(87) PCT Pub. No.: WO2023/006305
PCT Pub. Date: Feb. 2, 2023

(65) Prior Publication Data
US 2024/0267329 A1    Aug. 8, 2024

(30) Foreign Application Priority Data
Jul. 28, 2021  (EP) .................................... 21188161

(51) Int. Cl.
*H04L 45/76*  (2022.01)
*H04L 45/00*  (2022.01)
*H04L 45/586* (2022.01)

(52) U.S. Cl.
CPC ............ *H04L 45/76* (2022.05); *H04L 45/586* (2013.01); *H04L 45/66* (2013.01)

(58) Field of Classification Search
CPC ....... H04L 45/76; H04L 45/586; H04L 45/66; H04L 45/00; G06F 9/455
See application file for complete search history.

(56) References Cited

U.S. PATENT DOCUMENTS

| 11,646,909 B2 | 5/2023 | Schlennert et al. |
| 2020/0084144 A1 | 3/2020 | Nair et al. |
| (Continued) | | |

FOREIGN PATENT DOCUMENTS

| EP | 3035606 | 6/2016 |
| EP | 3646559 | 5/2020 |
| (Continued) | | |

OTHER PUBLICATIONS

PCT International Search Report dated Oct. 13, 2022 based on PCT/EP2022/067023 filed Jun. 22, 2022.
(Continued)

*Primary Examiner* — Ian N Moore
*Assistant Examiner* — Latresa A McCallum
(74) *Attorney, Agent, or Firm* — Cozen O'Connor

(57) ABSTRACT

A method for transmitting time-critical data, in which datagrams are transmitted from a first communication device in a first sub-network to a second communication device in a second sub-network via a third sub-network, wherein datagrams within the first and the second sub-networks are each forwarded by switching, while diagrams within the third sub-network are transmitted by routing, where the first sub-network includes at least a first coupling communication device connected to a first router and a second coupling communication device connected to a second router, where the first and second coupling communication devices select among each other a master coupling communication device, where a common virtual network layer address is assigned to both coupling communication devices, and where a
(Continued)

securing layer tunnel is built up by the third sub-network between the master coupling communication device and a third coupling communication device.

16 Claims, 4 Drawing Sheets

(56) References Cited

U.S. PATENT DOCUMENTS

| | | | |
|---|---|---|---|
| 2020/0220846 A1 | 7/2020 | Schwering | |
| 2022/0368561 A1* | 11/2022 | Schlennert | H04L 41/12 |
| 2023/0353422 A1 | 11/2023 | Neumann | |

FOREIGN PATENT DOCUMENTS

| | | |
|---|---|---|
| EP | 3787237 | 3/2021 |
| WO | 2021239371 | 12/2021 |

OTHER PUBLICATIONS

Huynh M. et al. "Resilience technologies in Ethernet"; Elsevier Science Publishers B.V., Computer Networks; Bd. 54; Nr. 1; pp. 57-78; ISSN: 1389-1286; 2010.

* cited by examiner

COMMUNICATION SYSTEM, COUPLING COMMUNICATION DEVICE AND METHOD FOR TRANSMITTING TIME-CRITICAL DATA

CROSS-REFERENCE TO RELATED APPLICATIONS

This is a U.S. national stage of application No. PCT/EP2022/067023 filed 22 Jun. 2022. Priority is claimed on European Application No. 21188161.0 filed 28 Jul. 2021, the content of which is incorporated herein by reference in its entirety.

BACKGROUND OF THE INVENTION

1. Field of the Invention

The present invention relates to a communication system, a coupling communication device and a method for transmitting time-critical data, where the method is suitable in particular for industrial automation systems.

2. Description of the Related Art

Industrial automation systems usually comprise a multiplicity of automation devices that are networked with one another via an industrial communication network and are used, as part of production or process automation, to control or regulate installations, machines or devices. Due to time-critical constraints in industrial automation systems, real-time communication protocols such as PROFINET, PROFIBUS, Real-Time Ethernet or Time-Sensitive Networking (TSN) are predominantly used for communication between automation devices. Control services or applications may in particular be distributed, in an automated and degree of utilization-dependent manner, among currently available servers or virtual machines of an industrial automation system.

Interruptions of communication connections between computer units of an industrial automation system or automation devices may lead to undesirable or unnecessary repetition of transmission of a service request. Furthermore, messages that are not transmitted, or not transmitted completely, may prevent, for example, an industrial automation system from transitioning to or remaining in a safe operating state.

In Ethernet-based communication networks, problems may arise when network resources are used to transmit dataflows or data frames with real-time requirements in competition with transmission of data frames with large payload data content without specific quality-of-service requirements. This may ultimately lead to dataflows or data frames with real-time requirements not being transmitted in accordance with a requested or required quality of service.

The Common Address Redundancy Protocol (CARP) makes it possible to implement application servers, firewalls or routers as high-availability systems. To this end, provision is made for at least two mutually redundant system components that are able to take on identical tasks and are assigned to the same subnet. The redundant system components each have a unique IP and MAC address and form a device group. This device group is likewise assigned an IP and MAC address via which other devices or systems communicate with the device group. Here, a system component of the device group assumes a master role to supervise the tasks of the device group, while the other system components assumes a slave role. When the system component with the master role fails, a system component to which a slave role was previously assigned assumes the tasks thereof and can be reached via the IP or MAC address assigned to the device group.

While it is possible to compensate quite easily for failure of a partial section within a route via dynamic routing or selecting an alternative section, failure of default gateways configured in terminals is more problematic. If the default gateway is not available as first router for the terminals, then routing from an impacted subnet is basically impossible. The Hot Standby Router Protocol (HSRP) is used to combine multiple routers to form a group of devices via which a logic router is implemented. The logic router is assigned an IP and MAC address via which a selected primary router of the group of devices can be reached. All other routers constitute secondary routers and, until further notice, cannot be reached via the IP or MAC address assigned to the logic router. The primary router signals its operational readiness to the secondary routers via a multicast message that is transmitted as standard every 3 seconds. If these multicast messages are absent over a relatively long time period, such as 10 seconds, then a previous secondary router is selected as a new primary router and connects the IP or MAC address assigned to the logic router to its network interface.

Problems caused by failure of a default gateway or a first router for terminals may also be solved via the Virtual Router Redundancy Protocol (VRRP). Unlike HSRP, VRRP enables use of an IP address of a router that is physically present as the IP address of a logic router implemented by a group of devices.

EP 3 646 559 B1 relates to a method for checking datagrams transmitted within an industrial automation system comprising multiple automation cells, in which datagrams to be checked are transmitted from the automation cells, via a respective firewall interface, to a firewall system in order to be checked, and are checked there in a rule-based manner. The firewall system is formed by at least one virtual machine provided within a data processing system comprising multiple computer units. To transmit the datagrams to be checked, a data link layer tunnel is set up in each case between the respective firewall interface and the firewall system. Both datagrams to be checked and datagrams that have been at least checked successfully are transmitted within the respective data link layer tunnel.

EP 3 035 606 A1 describes a method for transmitting data in a communication network comprising at least 2 virtual local area networks, in which dataflows are assigned a respective dataflow-specific target device identifier. When a dataflow is transmitted from a source communication device that is assigned to a first virtual local area network to a target communication device that is assigned to a second local area network, an identifier assigned to the dataflow within the first virtual local area network is converted into an identifier assigned to the dataflow within the second virtual local area network.

WO 2021/239371 A1 discloses a method for transmitting time-critical data in which datagrams are transmitted from a first communication device in a first subnet and to a second communication device in a second subnet via a third subnet. Here, the first and the second subnet are connected via a first switch and the second and the third subnet are connected via a second switch. The datagrams are forwarded from the first communication device to the first switch based on an identifier of a first virtual local area network and a priority indication. The first switch encapsulates the datagrams transmitted by the first communication device in each case in data frames, which are assigned to a dataflow by the third subnet, and inserts an identifier of a second virtual local area network into the data frames.

Based on the identifier of the second virtual local area network, according to international patent application WO 2021/239371 A1, resources along a selected path are reserved in the third subnet. The second switch extracts the datagrams that are encapsulated in the data frames assigned to the dataflow from received data frames and forwards the extracted datagrams to the second communication device based on the identifier of the first virtual local area network and the priority indication.

US 2020/084144 A1 describes a method in which network traffic is received at a redundant gateway device that is configured in accordance with a Redundant Gateway protocol. Known unicast traffic that is received at the redundant gateway device is forwarded from the redundant gateway device to a tunnel endpoint through a tunnel that is set up in accordance with a Tunneling protocol. Broadcast, unknown unicast and multicast traffic is forwarded to the tunnel endpoint through the tunnel when the redundant gateway device is a master gateway in accordance with the Redundant Gateway protocol. The broadcast, unknown unicast and multicast traffic is discarded when the redundant gateway device is a backup gateway in accordance with the Redundant Gateway protocol.

EP 3 787 237 A1 discloses a method for transmitting data in a redundantly operable communication network that comprises at least a first and a second subnet that each comprise communication devices that are connected to one another within a ring topology. A respective communication device having an activated ring control unit is provided in both subnets. Both subnets are connected to one another via two coupling sections to which two coupling communication devices are each connected. The coupling section to which a selected coupling communication device is connected is operated as inactive reserve coupling section until a problem occurs, while the other coupling section is operated as active main coupling section. The coupling communication devices connected to the main coupling section transmit status datagrams to the selected coupling communication device that additionally comprise configuration information as to whether the respective coupling communication device connected to the main coupling section comprises an activatable ring control unit.

In the event of transparent transmission of datagrams between data link layer subnets in which datagrams are forwarded by way of switching in accordance with OSI Layer 2, via network layer subnets in which datagrams are forwarded via routing in accordance with OSI Layer 3, not just undistorted transmission of original information is important. On the contrary, especially when using Tunneling protocols, the need arises for data transmission via network tunnels to be robust against failure of system components.

It is possible in principle to implement mutually redundant tunnel endpoints by way of Ethernet VPN (EVPN) in accordance with Internet Engineering Task Force (IETF) Request for Comments (RFC) 8365. However, corresponding concepts can be implemented only with a great deal of outlay, in particular in public 5G mobile radio networks, or are too complex for use in relatively simple automation networks.

SUMMARY OF THE INVENTION

It is an object of the present invention to provide a method that can be implemented with little outlay, for the transparent transmission of time-critical data via network layer transit networks, which makes it possible to compensate for failure of system components, and to provide a suitable implementation for performing the method.

This and other objects and advantages are achieved in accordance with the invention by a communication system, a coupling communication device, and a method for transmitting time-critical data, where datagrams are transmitted from a first communication device in a first subnet and to a second communication device in a second subnet via a third subnet. Here, the first and the third subnet are connected via at least a first and a second router, while the second and the third subnet are connected via at least a third router. Datagrams are each forwarded within the first and the second subnet via switching. On the contrary, datagrams are forwarded within the third subnet via routing.

Furthermore, in accordance with the invention, the first subnet has a ring topology and comprises at least a first coupling communication device that is connected to the first router, and a second coupling communication device that is connected to the second router. The second subnet comprises a third coupling communication device that is connected to the third router and to which a network layer address is assigned. Furthermore, the first and second coupling communication device select a master coupling communication device among one another. Here, a common virtual network layer address is assigned to both coupling communication devices or the master coupling communication device. The first or second coupling communication device not selected as master communication device is operated as reserve coupling communication device. The coupling communication devices are in particular switches.

The first and second coupling communication device, in accordance with the invention, select the master coupling communication device among one another via the Virtual Router Redundancy Protocol (VRRP). The virtual network layer address of the first and second coupling communication device may in this case likewise advantageously be provided via VRRP. Information about the virtual network layer address of the first and second coupling communication device may in particular be broadcast in the first subnet via VRRP advertisements in order to use the data link layer tunnel.

In accordance with the invention, a data link layer tunnel is set up through the third subnet via the first or second router and via the third router at least between the master coupling communication device and the third coupling communication device. Here, the datagrams transmitted from the first communication device to the second communication device are encapsulated in tunnel data frames within the data link layer tunnel, in particular in each case by being inserted into a payload data field of the tunnel data frames. A first endpoint of the data link layer tunnel is configured with the virtual network layer address of the first and second coupling communication device. On the contrary, a second endpoint of the data link layer tunnel is configured with the network layer address of the third coupling communication device. The tunnel data frames in which the datagrams transmitted from the first communication device to the second communication device are each encapsulated are Virtual extensible LAN (VXLAN) frames or Layer 2 Tunneling frames of the datagrams.

The first subnet, in accordance with the invention, has a ring topology, and datagrams are transmitted within the first subnet in accordance with the Media Redundancy Protocol (MRP). In the event of a changed selection or in the event of failure of the master coupling communication device, an MRP interconnection topology change is signaled. As a result of signaling of the MRP interconnection topology change, in all communication devices of the first subnet, which may in particular be switches or bridges, relearning of their respective data link layer address tables is triggered. The communication devices within the first subnet may thereby be adapted quickly and reliably, with regard to their configuration, to a changed selection of the coupling communication device operated as master coupling communication device.

The present invention thus enables simple, automated configuration of mutually redundant tunnel endpoints and also automatic reconfiguration of communication devices impacted thereby in the first subnet. Time-critical data can thereby be transmitted redundantly and transparently via network layer transit networks without 1 individual tunnel endpoint leading to interruption of a data link layer tunnel. Using VRRP to select the master coupling communication device and to provide a virtual network layer address for the first and second coupling communication device or for the master coupling communication device makes it possible to achieve a reliable and low-outlay implementation. Furthermore, the present invention makes it possible in principle to use any desired number of mutually redundant tunnel endpoints. The selection of the master coupling communication device and the provision of the virtual network layer address is not restricted to two coupling communication devices, but rather may be extended without any problems to a higher number of mutually redundant coupling communication devices.

In accordance with one particularly preferred embodiment of the present invention, at least the first and second coupling communication device form a group of coupling communication devices that are assigned to a virtual data link layer tunnel endpoint. Here, the coupling communication devices from the same group assigned to a virtual data link layer tunnel endpoint share information among one another about their respective operating state and monitor the master coupling communication device for failure based on this information. In the event of failure of a previously active master coupling communication device, all of the reserve coupling communication devices select a new master coupling communication device among one another. The first communication device may insert, for example, an identifier of a virtual local area network and a priority indication into the datagrams transmitted to the second communication device. Advantageously, the datagrams are forwarded from the first communication device to the master coupling communication device based on the identifier of the first virtual local area network and the priority indication. The master coupling communication device accordingly encapsulates the datagrams by transmitted the first communication device in each case in the tunnel data frames. On the contrary, the third coupling communication device extracts the datagrams that are encapsulated in the tunnel data frames from received tunnel data frames and forwards the extracted datagrams to the second communication device based on the identifier of the virtual local area network and the priority indication. Identifiers of virtual local area networks and priority indications may thus be used transparently to transmit datagrams, in particular datagrams in OSI Layer 2 networks, including in conjunction with the use of overlaid OSI Layer 3 transit networks.

The first and the second subnet may in particular be assigned to PROFINET cells, while the third subnet may be an IP-based transit network. Here, the datagrams are PROFINET frames. The above-described method for configuring the tunnel endpoints may also be implemented easily for tunnel endpoints in mobile radio networks. Consequently, the second subnet may comprise a mobile radio network, in particular a 5G mobile radio network, while the third subnet is an IP-based transit network.

Preferably, the MRP interconnection topology change is signaled via an MRP_InTopologyChange frame, and the data link layer address tables are each designed in the form of a forwarding database. Here, as a result of signaling of the MRP interconnection topology change, in all communication devices of the first subnet, relearning of their respective forwarding database is triggered. In accordance with a further advantageous embodiment of the present invention, the signaling of the MRP interconnection topology change, in all routers along the data link layer tunnel, triggers relearning of at least one data link layer address assigned to the first endpoint of the data link layer tunnel.

The objects and advantages in accordance with the invention are also achieved by a communication system according for performing the method in accordance with the above disclosed embodiments, where the system includes a first subnet that comprises at least a first communication device, a first coupling communication device and a second coupling communication device. The communication system furthermore contains a second subnet that comprises at least a second communication device and a third coupling communication device. Provision is also made for a third subnet that comprises at least a first router, a second router and a third router. Here, the first and the third subnet are connected via at least the first and the second router, while the second and the third subnet are connected via at least the third router.

The communication devices and coupling communication devices of the communication system in accordance with the invention are configured to forward datagrams within the first and the second subnet in each case via switching. On the contrary, the routers of the communication system in accordance with the invention are configured to forward datagrams within the third subnet via routing. The first subnet of the communication system in accordance with the invention furthermore has a ring topology, and the first coupling communication device is connected to the first router, while the second coupling communication device is connected to the second router. The third coupling communication device is furthermore connected to the third router and has an assigned network layer address. The first subnet is configured such that datagrams are transmitted within the first subnet in accordance with the Media Redundancy Protocol (MRP).

The first and second coupling communication device of the communication system in accordance with the invention are configured to select a master coupling communication device among one another via the Virtual Router Redundancy Protocol (VRRP) and to be assigned to a common virtual network layer address. The first and second coupling communication device are furthermore configured such that the first or second coupling communication device not selected as master communication device is operated as a reserve coupling communication device. Furthermore, the first and second coupling communication device of the communication system in accordance with the invention are configured such that, in the event of a changed selection or in the event of failure of the master coupling communication device, an MRP interconnection topology change is signaled and that, as a result of signaling of the MRP interconnection topology change, in communication devices of the first subnet, relearning of their respective data link layer address tables is triggered.

The coupling communication devices of the communication system in accordance with the invention are configured such that a data link layer tunnel is set up through the third subnet via the first or second router and via the third router between the master coupling communication device and the third coupling communication device and that datagrams transmitted from the first communication device to the second communication device are encapsulated in tunnel data frames within the data link layer tunnel. Here, the tunnel data frames in which the datagrams transmitted from the first communication device to the second communication device are each encapsulated are VXLAN frames or Layer 2 Tunneling frames of the datagrams. Furthermore, the coupling communication devices are configured such that a first endpoint of the data link layer tunnel is configured with the virtual network layer address of the first and second coupling communication device. The coupling communication devices are furthermore configured such that a second endpoint of the data link layer tunnel is configured with the network layer address of the third coupling communication device.

The coupling communication device in accordance with the invention is intended to perform the method in accordance with the above-disclosed embodiments and configured in the same way as the coupling communication devices of the communication system in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below with reference to an exemplary embodiment, in which.

DETAILED DESCRIPTION OF THE EXEMPLARY EMBODIMENTS

Figure 1:
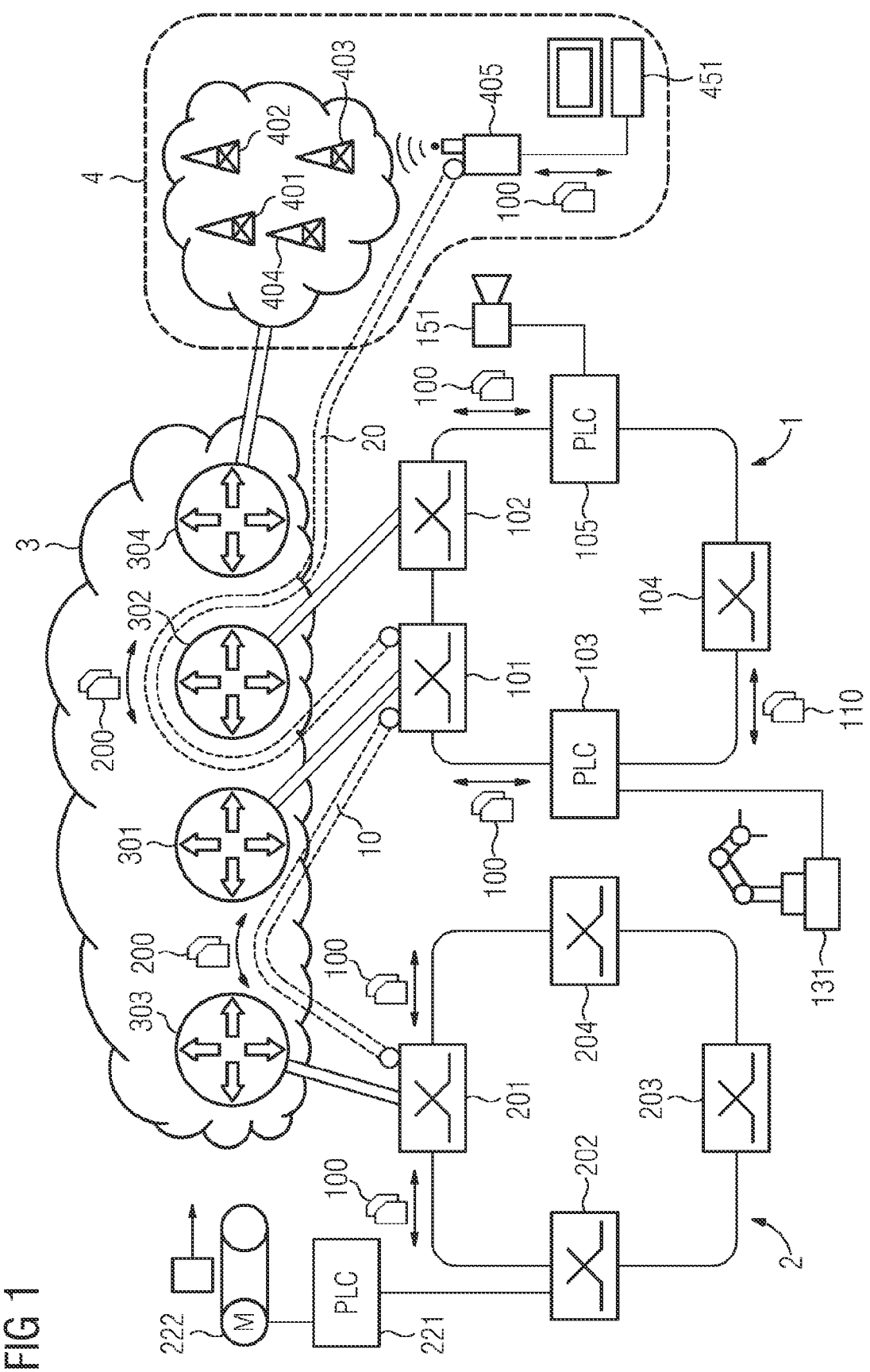
FIG. 1 shows a communication system, comprising multiple subnets, for transmitting time-critical data, with multiple data link layer tunnels in accordance with the invention.

The communication system illustrated in FIG. 1 for an industrial automation system is divided into four subnets 1-4. Datagrams 100 are forwarded within a first subnet 1 and a second subnet 2 in each case via switching. For this purpose, the first subnet 1 and the second subnet 2 each comprise multiple bridges or switches 101-102, 104, 201-204 as communication devices forwarding datagrams, and automation devices 103, 105, such as programmable logic controllers, having a bridge or switch function. The switches 101-102, 104, 201-204 each comprise multiple ports and are used in particular for the connection of programmable logic controllers 103, 105, 221, operating and observation stations, I/O controllers or I/O modules, which likewise constitute communication devices or communication terminals.

Programmable logic controllers 103, 105, 221 typically each comprise a communication module, a central processing unit and at least one input/output unit. Input/output units may in principle also be configured as decentralized peripheral modules that are arranged at a distance from a programmable logic controller. A programmable logic controller 103, 105, 221 can be connected to a switch or router or additionally to a field bus via the communication module. The input/output unit is used to exchange control variables and measured variables between a programmable logic controller 103, 105, 221 and a machine or device 131, 151, 222 controlled by the respective programmable logic controller 103, 105, 221. The central processing unit is provided in particular for ascertaining suitable control variables from recorded measured variables. The above components of a programmable logic controller 103, 105, 221 are connected to one another, for example, via a back-wall bus system.

In order to exchange control variables and measured variables with connected machines or devices, provision may in principle also be made for I/O modules. I/O modules may in particular be controlled via one I/O controller per automation cell. As an alternative thereto, I/O modules may also be driven by a remote programmable logic controller.

Within a third subnet 3, which is an overlaid IP-based transit network in the present exemplary embodiment, datagrams 200 are forwarded via routing. For this purpose, the third subnet 3 comprises multiple routers 301-304. The first subnet 1 and the third subnet 3 are connected via at least a first router 301 and a second router 302, while the second subnet 2 and the third subnet 3 are connected via at least a third router 303.

In order to couple the first subnet 1 to the third subnet 3, the first subnet 1 comprises at least a first coupling communication device 101 that is connected to the first router 301, and a second coupling communication device 102 that is connected to the second router 302. Here, the two coupling communication devices 101-102 are mutually redundant. The second subnet 2, in the present exemplary embodiment, on the other hand, comprises only a coupling communication device 201 that is connected to the third router 303 and constitutes a third coupling communication device of the communication system according to FIG. 1.

In the present exemplary embodiment, both the first subnet 1 and the second subnet 2 have a ring topology and thus offer a basis for applying ring redundancy protocols, such as the Media Redundancy Protocol (MRP) for the first subnet 1 or second subnet 2 or High-availability Seamless Redundancy Protocol (HSR) for the second subnet 2. Datagrams 100 are preferably transmitted accordingly within the first subnet 1 and the second subnet 2. The first subnet 1 and the second subnet 2 may in particular be assigned to PROFINET cells. Here, the datagrams 100 are PROFINET frames.

The second subnet 2 may in principle also have a tree topology and thus offer a basis for applying spanning tree protocols, such as Spanning Tree Protocol (STP), Multiple Spanning Tree Protocol (MSTP) or Rapid Spanning Tree Protocol (RSTP). Such spanning tree protocols also offer redundancy functions and make it possible to compensate for failure of individual transmission sections or links.

The communication system additionally comprises a fourth subnet 4 that, in a manner comparable to the second subnet 2, is coupled to the third subnet 3 and comprises a mobile radio network, in particular a 5G mobile radio network, containing multiple base stations 401, 402, 403, 404. Here, the fourth subnet 4 and the third subnet 3 are connected via at least a fourth router 304. It is possible, for example, to connect a mobile radio modem 405 to these base stations 401, 402, 403, 404, with an automation device 451, such an operating and observation station, being connected to said mobile radio modem. Here, the mobile radio modem 451 constitutes a fourth coupling communication device for connecting the operating and observation system 451 to the overlaid third subnet 3.

An operating and observation station 451 is used to visualize process data or measured variables and control variables that are processed or recorded by programmable logic controllers, input/output units or sensors. An operating and observation station 451 is used in particular to display values of a control circuit and to change control parameters. Operating and observation stations 451 comprise at least a graphical user interface, an input device, a processor unit and a communication module.

In the communication system, datagrams 100 are in particular exchanged, i.e., transmitted and received bidirectionally, between a first communication device in the first subnet 1 and a second communication device in the second subnet 2 via the overlaid third subnet 3. Here, for example, the programmable logic controllers 103, 105 in the first subnet 1 may constitute a first communication device, while the programmable logic controller 221 in the second subnet 2 may constitute a second communication device.

The first coupling communication device 101 and the second coupling communication device 102 are each configured, together with the respective other coupling communication device, to select a master coupling communication device among one another and to be assigned to a common virtual network layer address (address for OSI Layer 3). Furthermore, both coupling communication devices 101, 102 are configured such that the first or second coupling communication device not selected as a master communication device is operated as a reserve coupling communication device. According to FIG. 1, the first coupling communication device 101 is selected as the master communication device.

In accordance with one preferred embodiment, the two mutually redundant coupling communication devices 101, 102 select the master coupling communication device among one another via the Virtual Router Redundancy Protocol (VRRP). Accordingly, a virtual network layer address of the two mutually redundant coupling communication devices 101, 102 is also provided via VRRP. Furthermore, information about the virtual network layer address of the two mutually redundant coupling communication devices 101, 102 is broadcast in the first subnet 1 via VRRP advertisements 110 to use the data link layer tunnel 10.

A data link layer tunnel 10 is set up through the third subnet 3 via the first router 301 or via the second router 302 and via the third router 303 between the master coupling communication device 101 or 102 and the third coupling communication device 201. Here, datagrams 100 transmitted from the first communication device 103, 105 to the second communication device 221 are encapsulated in tunnel data frames 200 within the data link layer tunnel 10. This applies in the same way in the opposite direction.

The master coupling communication device encapsulates each of the datagrams 100 transmitted from the first communication device to the second communication device by inserting them into a payload data field of the tunnel data frames 200. The tunnel data frames 200 in which the datagrams 200 transmitted from the first communication device to the second communication device are each encapsulated are preferably Virtual extensible LAN (VXLAN) frames or Layer 2 Tunneling frames of the datagrams.

In the present exemplary embodiment, a further data link layer tunnel 20 is also set up through the third subnet 3 via the first router 301 or via the second router 302 and via the fourth router 304 between the master coupling communication device 101 or 102 and the fourth coupling communication device 405. Here, datagrams 100 transmitted from the first communication device 103, 105 to the operating and observation station 451 are encapsulated in tunnel data frames 200 within the further data link layer tunnel 20. Otherwise, data are transmitted via the further data link layer tunnel 20 and the further data link layer tunnel 20 is configured and set up in the same way as the use of the data link layer tunnel 10. The following explanations regarding the data link layer tunnel 10 therefore also apply analogously to the further data link layer tunnel 20.

The two mutually redundant coupling communication devices 101, 102 are each configured such that a first endpoint of the data link layer tunnel 100 is configured with the virtual network layer address of the first and second coupling communication device or of the master coupling communication device, while a second endpoint of the data link layer tunnel 10 is configured with a network layer address of the third coupling communication device 201. Here, the first endpoint is assigned to the first subnet 1, and the second endpoint is assigned to the second subnet 2.

Figure 2:
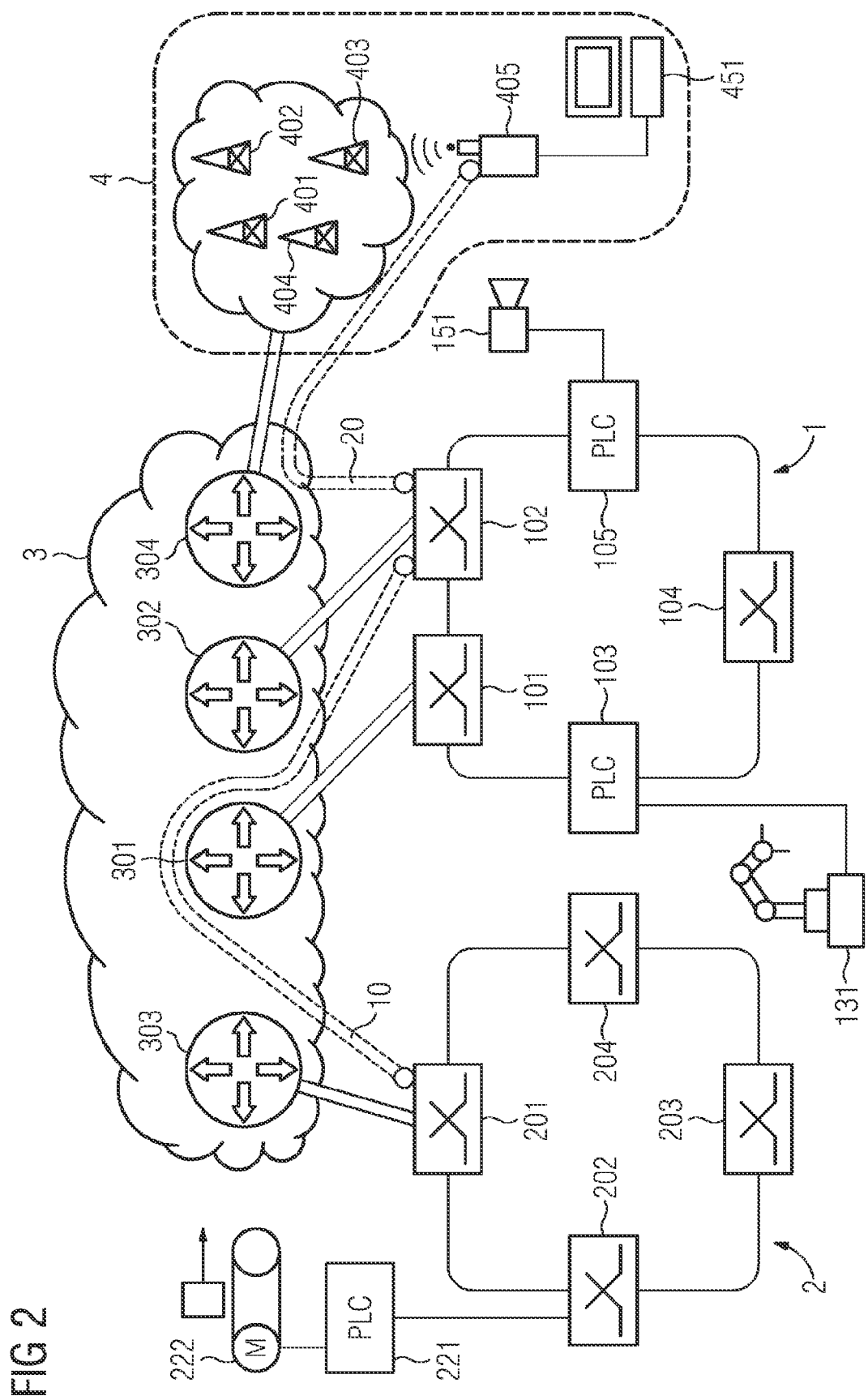
FIG. 2 shows the communication system of FIG. 1 following a changeover of endpoints of the data link layer tunnel.

The mutually redundant coupling communication devices 101, 102 form a group of coupling communication devices that are assigned to a virtual data link layer tunnel endpoint. The coupling communication devices from the same group assigned to a virtual data link layer tunnel endpoint share information about their respective operating state among one another and monitor the respective master coupling communication device for failure based on this information. In the event of failure of a previously active master coupling communication device, all reserve coupling communication devices in principle select a new master coupling communication device among one another. If, for example, the first coupling communication device 101 as active master coupling communication device fails, then the second coupling communication device 102 takes on its role as master coupling communication device. According to FIG. 2, the data link layer tunnel 10 is set up in this case via the second router 302 and the third router 303. In the same way, the further data link layer tunnel 20 is set up via the second router 302 and the fourth router 304.

In the present exemplary embodiment, the datagrams 100 are transmitted within the first subnet 1 in accordance with the Media Redundancy Protocol (MRP). In the event of a changed selection or in the event of failure of the master coupling communication device, an MRP interconnection topology change is signaled. An MRP interconnection topology change may be signaled for example by way of an MRP_InTopologyChange frame. As a result of signaling of the MRP interconnection topology change, in communication devices 101, 102, 103, 104, 105 of the first subnet 1, relearning of their respective data link layer address tables or forwarding database (FDB) is advantageously triggered. All communication devices 101, 102, 103, 104, 105 of the first subnet 1 preferably relearn their respective forwarding database in the event of an MRP interconnection topology change. Accordingly, as a result of signaling of the MRP interconnection topology change, in routers 301, 302, 303, 304 along a data link layer tunnel 10, 20, relearning of a data link layer address assigned to the first endpoint of the data link layer tunnel 10, 20 is triggered.

Figure 3:
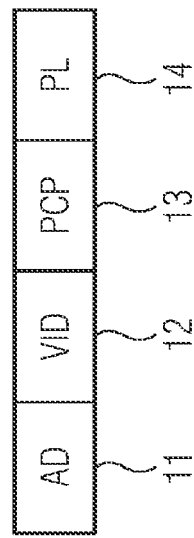
FIG. 3 shows a schematic illustration of a datagram exchanged within the communication system of FIG. 1 between communication devices of different subnets prior to encapsulation in a data tunnel frame.

The first communication device, such as one of the programmable logic controllers 103, 105, in the present exemplary embodiment according to FIG. 3, inserts an identifier 12 of a first VLAN, for example VID=0, and a priority indication 13, for example PCP=6, into the datagrams 100 that are transmitted to the second communication device, such as the programmable logic controller 221. As a result, in PROFINET cells that comprise the first subnet 1 or the second subnet 2, high-priority control data that are transmitted cyclically in PROFINET cells within predefined or reserved time windows are identified. For this purpose, in the present exemplary embodiment, all communication devices 101, 102, 103, 104, 105, 201, 202, 203, 204, 221 are operated with synchronous clocking in the PROFINET cells. The datagrams are forwarded from the first communication device to the master coupling communication device based on the identifier 12 of the first virtual local area network and the priority indication 13. The datagrams 100 comprise an address field 11 and a payload data field 14 and, in the present exemplary embodiment, correspond basically to Ethernet frames in terms of their structure.

Figure 4:
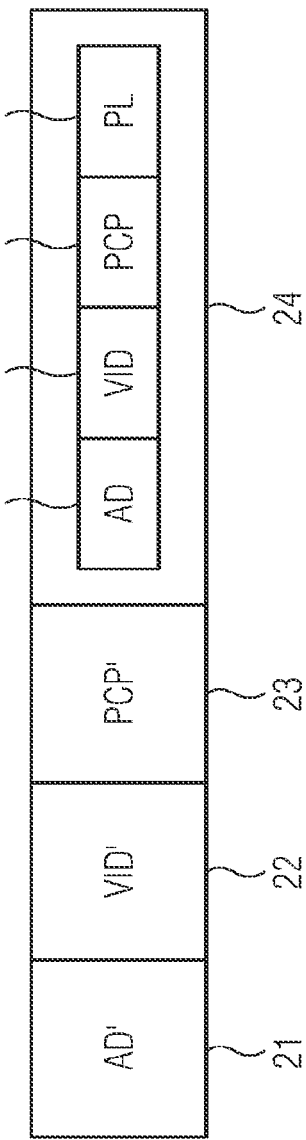
FIG. 4 shows a schematic illustration of a tunnel data frame in which the datagram of FIG. 3 is encapsulated.

The master communication device encapsulates the datagrams 100 transmitted by the first communication device, according to FIG. 4, in each case by inserting them into a payload data field 24 of the tunnel data frames 200. Here, the payload data field 24 of the tunnel data frames 200 comprises in particular the identifier 12 of the first VLAN and the priority indication 13 for forwarding within the first or second subnet. The tunnel data frames 200 furthermore comprise an address field 21 and correspond to Ethernet frames in terms of their structure. An identifier 22, used for routing through the data link layer tunnel 10, of a second of VLAN, for example VID'=1, and a priority indication 23, for example PCP'=6, may additionally be inserted into the tunnel data frames 200.

The third coupling communication device 201 extracts the datagrams 100 that are encapsulated in the tunnel data frames 200 from received tunnel data frames 200 and forwards the extracted datagrams 100 to the second communication device based on the identifier 12 of the virtual local area network and the priority indication 13. Accordingly, the fourth coupling communication device 405 extracts datagrams 100 intended for the operating and observation station 451 from tunnel data frames 200 and forwards the datagrams 100 to the operating and observation station 451.

Figure 5:
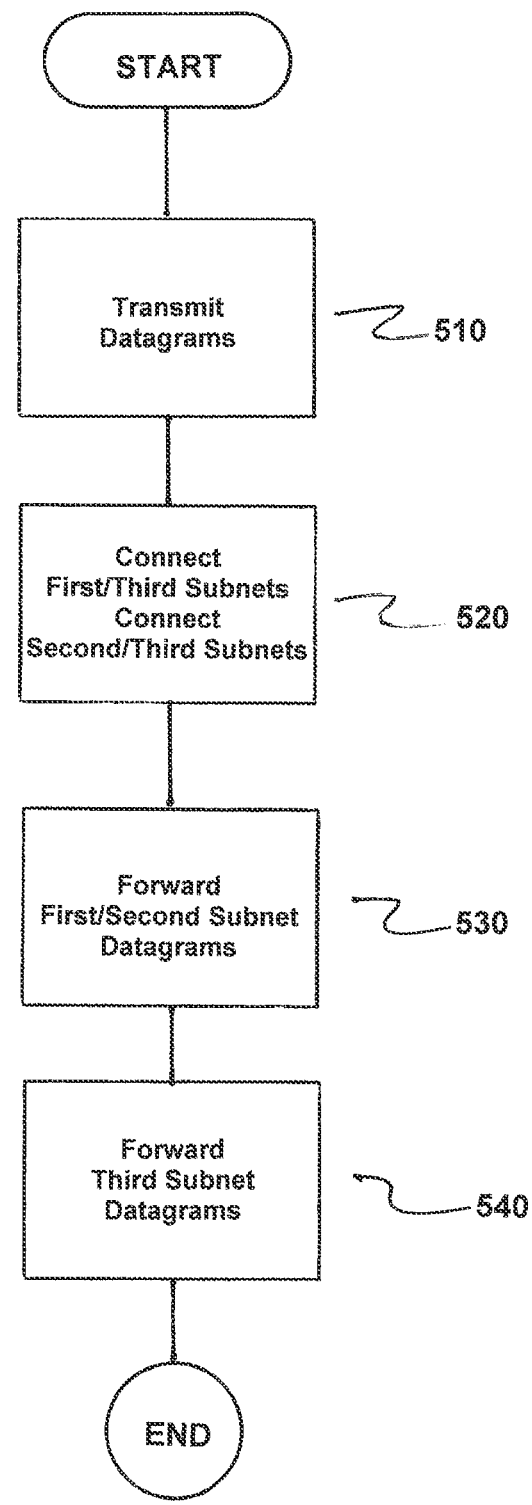
FIG. 5 is a flowchart of the method in accordance with the invention.

FIG. 5 is a flowchart of the method for transmitting time critical data. The method comprises transmitting datagrams 100 from a first communication device 103, 105 in a first subnet 1 and to a second communication device 221 in a second subnet 2 via a third subnet 3, as indicated in step 510.

Next, the first and the third subnet are connected via at least a first and a second router 301 and connecting the second and third subnet via at least a third router 302, as indicated in step 520.

Next, each datagram within the first and the second subnet is forwarded via switching, as indicated in step 530. Next, datagrams within the third subnet are forwarded via routing, as indicated in step 540.

In accordance with the method, the first subnet includes a ring topology and comprising at least a first coupling communication device 101 which is connected to the first router, and a second coupling communication device 102 which is connected to the second router, datagrams being a within the first subnet in accordance with the Media Redundancy Protocol (MRP).

In addition, the second subnet comprises a third coupling communication device 201 which is connected to the third router and to which a network layer address is assigned.

In accordance with then method, the first and second coupling communication device select a master coupling communication device among one another via a Virtual Router Redundancy Protocol (RRP), where a common virtual network layer address is assigned to the first and second coupling communication devices and one of the first and second coupling communication device not selected as master communication device is operated as a reserve coupling communication device.

Furthermore, an MRP interconnection topology change is signaled in an event of a changed selection or an event of failure of the master coupling communication device. Additionally, relearning of respective data link layer address tables in communication devices of the first subnet is triggered as a result of signaling of the MRP interconnection topology change.

In accordance with the method, moreover, a data link layer tunnel 10 is set up through the third subnet via the first or second router and via the third router at least between the master coupling communication device the and third coupling communication device, where the datagrams transmitted from the first communication device to the second communication device are encapsulated in tunnel data frames 200 within the data link layer tunnel, and the tunnel data frames in which the datagrams transmitted from the first communication device to the second communication device are each encapsulated are Virtual extensible LAN (VXLAN) frames or Layer 2 Tunneling frames of the datagrams.

Furthermore, a first endpoint of the data link layer tunnel is configured with the virtual network layer address of the first and second coupling communication device, and a second endpoint of the data link layer tunnel is configured with the network layer address of the third coupling communication device.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmitting time-critical data, comprising:
   transmitting datagrams from a first communication device in a first subnet and to a second communication device in a second subnet via a third subnet;
   connecting the first and the third subnet via at least a first and a second router and connecting the second and third subnet via at least a third router;
   forwarding each datagram within the first and the second subnet via switching; and
   forwarding datagrams within the third subnet via routing;
   wherein the first subnet includes a ring topology and comprising at least a first coupling communication device which is connected to the first router, and a second coupling communication device which is connected to the second router, datagrams being a within the first subnet in accordance with the Media Redundancy Protocol (MRP);
   wherein the second subnet comprises a third coupling communication device which is connected to the third router and to which a network layer address is assigned;
   wherein the first and second coupling communication device select a master coupling communication device among one another via a Virtual Router Redundancy Protocol (RRP), a common virtual network layer address being assigned to the first and second coupling communication devices and one of the first and second coupling communication device not selected as master communication device being operated as a reserve coupling communication device;
   wherein an MRP interconnection topology change is signaled in an event of a changed selection or an event of failure of the master coupling communication device;
   wherein relearning of respective data link layer address tables in communication devices of the first subnet is triggered as a result of signaling of the MRP interconnection topology change;
   wherein a data link layer tunnel is set up through the third subnet via the first or second router and via the third router at least between the master coupling communication device and the third coupling communication device, the datagrams transmitted from the first communication device to the second communication device being encapsulated in tunnel data frames within the data link layer tunnel, and the tunnel data frames in which the datagrams transmitted from the first communication device to the second communication device are each encapsulated being Virtual extensible LAN (VXLAN) frames or Layer 2 Tunneling frames of the datagrams;
   wherein a first endpoint of the data link layer tunnel is configured with the virtual network layer address of the first and second coupling communication device; and
   wherein a second endpoint of the data link layer tunnel is configured with the network layer address of the third coupling communication device.

2. The method as claimed in claim 1, wherein the virtual network layer address of the first and second coupling communication device is provided via Virtual Router Redundancy Protocol (VRRP).

3. The method as claimed in claim 2, wherein information about the virtual network layer address of the first and second coupling communication device is broadcast in the first subnet via VRRP advertisements to utilize the data link layer tunnel.

4. The method as claimed in claim 2, wherein information about the virtual network layer address of the first and second coupling communication device is broadcast in the first subnet via VRRP advertisements to utilize the data link layer tunnel.

5. The method as claimed in claim 1, wherein at least the first and second coupling communication device form a group of coupling communication devices which are assigned to a virtual data link layer tunnel endpoint;
   wherein coupling communication devices from the same group assigned to a virtual data link layer tunnel endpoint share information among one another about their respective operating state and monitor the master coupling communication device for failure based on this information; and
   wherein all reserve coupling communication devices select a new master coupling communication device among one another in an event of failure of a previously active master coupling communication device.

6. The method as claimed in claim 1, wherein at least the first and second coupling communication device form a group of coupling communication devices which are assigned to a virtual data link layer tunnel endpoint;
   wherein coupling communication devices from the same group assigned to a virtual data link layer tunnel endpoint share information among one another about their respective operating state and monitor the master coupling communication device for failure based on this information; and
   wherein all reserve coupling communication devices select a new master coupling communication device among one another in an event of failure of a previously active master coupling communication device.

7. The method as claimed in claim 1, wherein at least the first and second coupling communication device form a group of coupling communication devices which are assigned to a virtual data link layer tunnel endpoint;
   wherein coupling communication devices from the same group assigned to a virtual data link layer tunnel endpoint share information among one another about their respective operating state and monitor the master coupling communication device for failure based on this information; and
   wherein all reserve coupling communication devices select a new master coupling communication device among one another in an event of failure of a previously active master coupling communication device.

8. The method as claimed in claim 1, wherein the master coupling communication device encapsulates each datagrams transmitted from the first communication device to the second communication device by inserting said transmitted datagrams into a payload data field of the tunnel data frames.

9. The method as claimed in claim 1, wherein the first communication device inserts an identifier of a virtual local area network and a priority indication into the datagrams transmitted to the second communication device;
   wherein the datagrams are forwarded from the first communication device to the master coupling communication device based on the identifier of the first virtual local area network and the priority indication;
   wherein the master coupling communication device encapsulates each datagrams transmitted by the first communication device in the tunnel data frames; and
   wherein the third coupling communication device extracts the datagrams which are encapsulated in the tunnel data frames from received tunnel data frames and forwards the extracted datagrams to the second communication device based on the identifier of the virtual local area network and the priority indication.

10. The method as claimed in claim 1, wherein the first and the second subnet are assigned to PROFINET cells; wherein the third subnet is an IP-based transit network; and wherein the datagrams are PROFINET frames.

11. The method as claimed in claim 1, wherein the second subnet comprises a mobile radio network; and wherein the third subnet is an IP-based transit network.

12. The method as claimed in claim 1, wherein the a mobile radio network comprises a 5G mobile radio network.

13. The method as claimed in claim 1, wherein the MRP interconnection topology change is signaled via an MRP_InTopologyChange frame;
  wherein the data link layer address tables are each configured as forwarding database; and
  wherein relearning of respective forwarding database is triggered in all communication devices of the first subnet as a result of signaling of the MRP interconnection topology change.

14. The method as claimed in claim 1, wherein relearning of at least one data link layer address assigned to the first endpoint of the data link layer tunnel is triggered in routers along the data link layer tunnel as a result of signaling of the MRP interconnection topology change.

15. A communication system, comprising:
  a first subnet comprising at least a first communication device, a first coupling communication device and a second coupling communication device;
  a second subnet comprising at least a second communication device and a third coupling communication device;
  a third subnet comprising at least a first router, a second router and a third router, the first and third subnets being connected via at least the first and second routers and the second and third subnets being connected via at least the third router;
  wherein the communication devices and coupling communication devices are configured to forward each datagram within the first and second subnets via switching;
  wherein the routers are configured to forward datagrams within the third subnet via routing;
  wherein the first subnet has a ring topology, the first coupling communication device is connected to the first router and the second coupling communication device is connected to the second router;
  wherein the third subnet is configured such that datagrams are transmitted within the first subnet in accordance with a Media Redundancy Protocol (MRP);
  wherein the third coupling communication device is connected to the third router and has an assigned network layer address;
  wherein the first and second coupling communication devices are configured to select a master coupling communication device among one another via a Virtual Router Redundancy Protocol (VRRP) and to be assigned to a common virtual network layer address;
  wherein the first and second coupling communication devices are configured such that the first or second coupling communication devices not selected as master communication device is operated as a reserve coupling communication device;
  wherein the coupling communication devices are configured such that, in an event of a changed selection or in an event of failure of the master coupling communication device, an MRP interconnection topology change is signaled;
  wherein the first subnet is configured such that relearning of respective data link layer address tables in communication devices of the first subnet is triggered as a result of signaling of the MRP interconnection topology change;
  wherein the coupling communication devices are configured such that a data link layer tunnel is set up through the third subnet via the first or second router and via the third router between the master coupling communication device and the third coupling communication device and such that datagrams transmitted from the first communication device to the second communication device are encapsulated in tunnel data frames within the data link layer tunnel, the tunnel data frames in which the datagrams transmitted from the first communication device to the second communication device are each encapsulated being Virtual extensible LAN (VXLAN) frames or Layer 2 Tunneling frames of the datagrams;
  wherein the coupling communication devices are configured such that a first endpoint of the data link layer tunnel is configured with a virtual network layer address of the first and second coupling communication device;
  wherein the coupling communication devices are configured such that a second endpoint of the data link layer tunnel is configured with the network layer address of the third coupling communication device.

16. A coupling communication device, comprising:
  a processor; and
  memory;
  wherein the coupling communication device is configured to:
    forward datagrams within a first subnet comprising the coupling communication device via switching, the subnet including a ring topology,
    transmit datagrams within the first subnet in accordance with a Media Redundancy Protocol (MRP);
    connect to a first router of a third subnet as a first coupling communication device or connect to a second router of the third subnet as a second coupling communication device;
    select, together with the first or second coupling communication device, a master coupling communication device among one another via a Virtual Router Redundancy Protocol (VRRP) accept assignment to a common virtual network layer address;
    operate the first or second coupling communication device not selected as master communication device as a reserve coupling communication device;
    signal, in an event of a changed selection or in an event of failure of the master coupling communication device, an MRP interconnection topology change;
    trigger relearning of respective data link layer address tables in all communication devices of the first subnet as a result of signaling of the MRP interconnection topology change;
    set up a data link layer tunnel through the third subnet via the first or second router and via a third router of the third subnet between the master coupling communication device and a third coupling communication device and encapsulate datagrams transmitted from a first communication device of the first subnet to a second communication device of the second subnet in tunnel data frames within the data link layer tunnel, the tunnel data frames in which the datagrams transmitted from the first communication device to the second communication device each being encapsulated are Virtual extensible LAN (VXLAN) frames or Layer 2 Tunneling frames of the datagrams;

configure a first endpoint of the data link layer tunnel with the virtual network layer address of the first and second coupling communication device; and configure a second endpoint of the data link layer tunnel with a network layer address of the third coupling communication device.

* * * * *